United States Patent
Venkatachalapathy et al.

(10) Patent No.: US 8,052,074 B2
(45) Date of Patent: Nov. 8, 2011

(54) APPARATUS AND PROCESS FOR DEPOSITING COATINGS

(75) Inventors: Viswanathan Venkatachalapathy, Bangalore (IN); Yuk-Chiu Lau, Ballston Lake, NY (US); Eklavya Calla, Rajasthan (IN)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 12/548,572

(22) Filed: Aug. 27, 2009

(65) Prior Publication Data

US 2011/0052824 A1    Mar. 3, 2011

(51) Int. Cl.
*A01C 3/06* (2006.01)
*B05B 1/24* (2006.01)
*B05B 7/00* (2006.01)
*B05D 1/12* (2006.01)
*B24C 5/04* (2006.01)

(52) U.S. Cl. ......... 239/654; 239/79; 239/650; 427/180; 118/308; 451/102

(58) Field of Classification Search .................. 239/79, 239/650, 654, 398, 434, 426, 78, 80, 81; 427/446, 180; 118/308; 451/38, 102
See application file for complete search history.

(56) References Cited

U.S. PATENT DOCUMENTS

| | | | |
|---|---|---|---|
| 4,741,286 A * | 5/1988 | Itoh et al. ...................... | 118/620 |
| 5,302,414 A | 4/1994 | Alkhimov et al. | |
| 6,811,812 B2 * | 11/2004 | Van Steenkiste ............. | 427/189 |
| 6,972,138 B2 * | 12/2005 | Heinrich et al. ............... | 427/446 |
| 7,475,831 B2 * | 1/2009 | Van Steenkiste et al. ........ | 239/13 |
| 7,637,441 B2 * | 12/2009 | Heinrich et al. ............... | 239/135 |
| 2004/0058065 A1 * | 3/2004 | Steenkiste et al. ............ | 427/180 |
| 2006/0113359 A1 * | 6/2006 | Teets et al. ..................... | 228/261 |

OTHER PUBLICATIONS

L. Ajdelsztajn and E. J. Lavernia; B. Jodoin, P. Richer, E. Sansoucy; Cold Gas Dynamic Spraying of Fe-based Amorphous Alloy; Dept. of Chemical Engineering and Materials Science, University of California, Davis; Dept. of Mechanical Engineering, University of Ottawa, Ontario, Canada; 2006 International Thermal Spray Conference, Seattle, Washington.

* cited by examiner

*Primary Examiner* — Dinh Nguyen
*Assistant Examiner* — Justin Jonaitis
(74) *Attorney, Agent, or Firm* — Ernest G. Cusick; Gary M. Hartman; Domenica N.S. Hartman

(57) ABSTRACT

A spray coating process and apparatus suitable for depositing coatings on surfaces of components, and particularly surfaces that are difficult to access with conventional cold spraying equipment. The process and apparatus employ a spray gun having a tubular body with a longitudinal axis and an exit at one end thereof. The body has a first portion defining a converging passage, a second portion defining a diverging passage that defines the exit of the body, and a throat portion therebetween that defines a throat between and connecting the converging and diverging passages. The gun is further equipped with at least one gas inlet for introducing a gas upstream of the converging passage, and at least one feedstock inlet for introducing a feedstock at or immediately upstream of the throat.

19 Claims, 3 Drawing Sheets

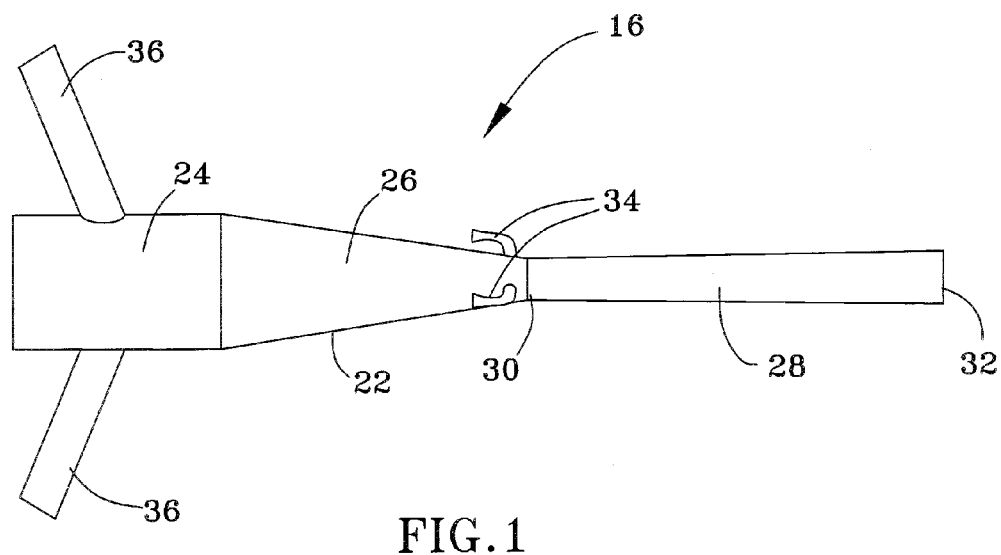
FIG. 1
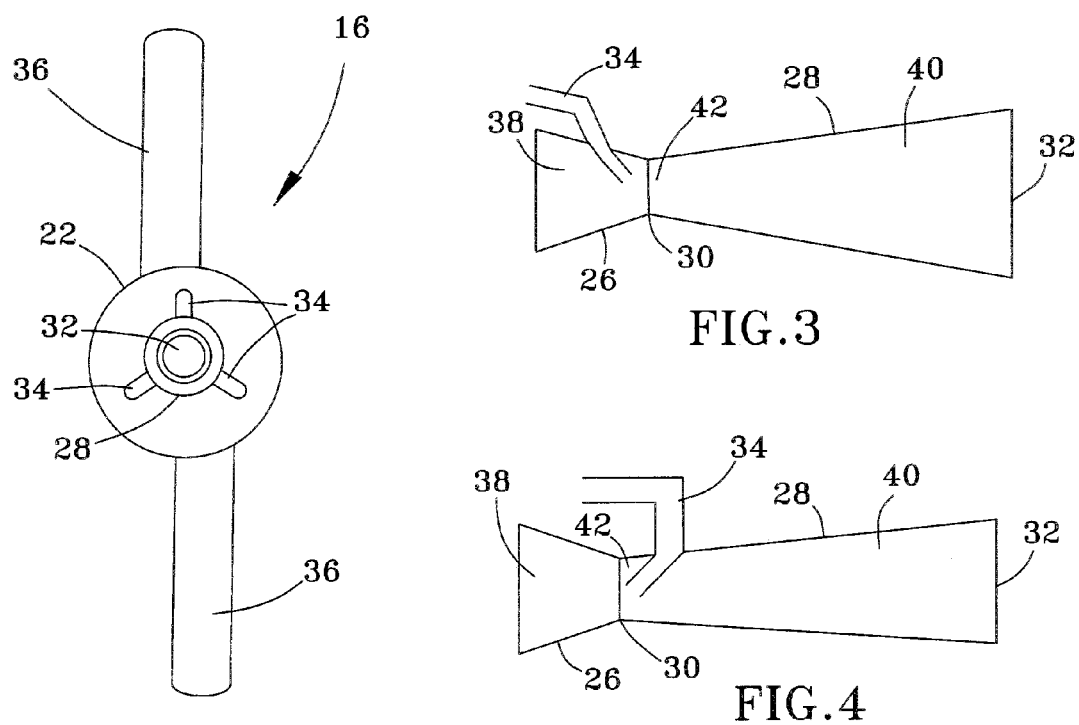
FIG. 2
FIG. 3
FIG. 4

APPARATUS AND PROCESS FOR DEPOSITING COATINGS

BACKGROUND OF THE INVENTION

The present invention generally relates to equipment and processes for depositing coatings. More particularly, this invention relates to coating equipment capable of depositing protective coatings within confined internal spaces of components exposed to high temperatures, such as the hostile thermal environment of a gas turbine, and to such components and their protective coatings.

Certain components of aircraft and industrial gas turbines, including gas turbine engines, steam turbines and wind turbines employed in power generation, require protective coatings for applications subjected to wear, corrosion, solid particle erosion, high temperatures, etc. Nonlimiting examples of protective coatings include metallic and ceramic-based coatings that provide wear, erosion, oxidation, corrosion, and/or thermal protection. Metallic coatings include diffusion coatings and overlay coatings, an example of the latter being MCrAlX coatings (where M is iron, cobalt and/or nickel, and X is yttrium or another rare earth element). Overlay coatings are commonly deposited directly on the surface of a substrate by thermal spraying and/or electron beam physical vapor deposition (EBPVD). During subsequent exposures to high temperatures, such as during turbine operation, environmental coatings form a tightly adherent oxide layer, for example, alumina ($Al_2O_3$), that provides a barrier to oxidizing agents and other sources of environmental attack. A variety of ceramic materials are used to provide wear, corrosion, oxidation, erosion, and/or thermal protection. For wear, corrosion and erosion resistance, coating materials commonly used include WC—Co (typically about 5 to 50% Co by weight), TiN, TaC, $Al_2O_3$, $TiO_2$, yttria-stabilized zirconia (YSZ), etc. To promote adhesion and extend the service life of a ceramic coating, an oxidation-resistant bond coat is often employed. Bond coats are typically in the form of a diffusion coating or overlay coating of the type noted above whose tightly adherent oxide (e.g., alumina) layer helps to adhere the ceramic coating to the bond coat.

Thermal spray deposition processes generally encompass such techniques as plasma spraying (air, vacuum and low pressure) and high velocity oxy-fuel (HVOF). Thermal spray processes involve propelling melted or at least heat-softened particles of a heat fusible material (e.g., metal, ceramic) against a surface, where the particles are quenched and bond to the surface to produce a coating. Coatings deposited by thermal spray processes are typically characterized by a degree of inhomogeneity and porosity that occurs as a result of the deposition process, in which "splats" of molten material are deposited and subsequently solidify. Due to the very high temperatures within the thermal spray, oxidation and/or phase changes of the deposited particles are common.

Cold spraying is a relatively new particulate deposition technique. As described in U.S. Pat. No. 5,302,414, cold spraying deposits a coating by propelling particles (powders) at high velocities, but at significantly lower temperatures compared to conventional thermal spray processes. A process gas (for example, helium, air, nitrogen, etc.) is used to accelerate the powder particles through a converging-diverging nozzle, yielding a supersonic gas flow and particle velocities of 300 m/s and higher. The process gas may be heated to a temperature of 800° C., but is more typically heated to less then 600° C. to minimize or eliminate in-flight oxidation and phase changes in the deposited material. As a result of the relatively low deposition temperatures and very high velocities, cold spray processes offer the potential for depositing well-adhering, dense, hard and wear-resistant coatings whose purity depends primarily on the purity of the powder used.

The gas flow in a converging-diverging nozzle operating in the choked condition is described by equation (1) below. Further details of gas flows in converging-diverging nozzles typically used in most cold spraying equipment can be understood from the theory of one-dimensional compressible fluid flow, published in various references including P. H. Oosthuizen and E. Carscallen, Compressible Fluid Flow (1997). Exit gas velocity will depend on the gun design, for example, the ratio of the area of the nozzle exit to the nozzle throat according to equation (1).

$$A/A^* = (1/M)[2/(\gamma+1)][1+((\gamma-1)/2)M^2]^{(\gamma+1)/2(\gamma-1)} \quad (1)$$

where A is the area at the nozzle exit, A* is the area of the nozzle throat, M is the Mach number of the exiting gas, and gamma ($\gamma$) is the adiabatic index or heat capacity ratio of the heat capacity at constant pressure (Cp) to the heat capacity at constant volume (Cv) for the process gas used. From equation (1), it is apparent that the gas flow parameters, including exit velocity, depend on the ratio A/A*. A certain minimum gas mass flow is necessary to operate the nozzle in the choked condition of equation (1) in order for the exit gas velocity to be the Mach number predicted by equation (1). Gases having higher gamma values are beneficial since they result in relatively higher Mach numbers. Increasing the gas mass flow rate beyond what is necessary to achieve the choked condition does not increase the gas exit velocity, but is advantageous for increasing the density of the gas in the nozzle. A denser gas is able to exert more drag force on the feedstock particles, and thus is more effective to accelerate the particles. In this manner, the effect of increasing the gas mass flow rate serves to increase the particle exit velocity. Higher particle velocities are generally preferred in cold spraying processes, since the particles must travel above a certain minimum critical velocity to form a well-adherent and dense coating in cold spraying. Higher gas mass flow rates for achieving higher particle exit velocities are often obtained by increasing the gas pressure at the gas inlet to the nozzle.

In contrast to gas mass flow rate and the geometry of the converging-diverging nozzle, the role of temperature in increasing the gas velocity in a cold spraying gun is somewhat indirect. As can be seen from the above equation (1), the gas temperature is not related to the exit Mach number. However, because the speed of sound increases with temperature, increasing gas temperature influences the exit gas velocity since a hotter gas will travel at an higher velocity.

Though offering the above advantages, the convergent-divergent design requirements of cold spray guns have resulted in relatively large guns, which has prevented the use of cold spraying processes for depositing coatings on surfaces within confined spaces and/or where access is limited or otherwise difficult. Particular examples include the interior surfaces of transition pieces of combustors for industrial gas turbines, where a dense metallic coating would be very beneficial for providing wear, corrosion and oxidation protection. As a result, interior surfaces of transition pieces are typically coated using air plasma spraying (APS), whose torches can be accommodated within the relatively small and confined interior of a transition piece. However, because APS processes are carried out at very high temperatures in an oxidizing atmosphere, traditional APS metallic coatings are porous and highly oxidized, which compromises the coating performance. Accordingly, it would be desirable to coat the interior surfaces of transition pieces and other hardware with a dense metallic coating that is substantially free of oxides and phase change effects, similar to the types of coatings that can be deposited by cold spraying.

BRIEF DESCRIPTION OF THE INVENTION

The present invention provides a spray coating process and apparatus suitable for depositing coatings on surfaces of components that are otherwise difficult to access with conventional cold spraying equipment. The process and apparatus are particularly well suited for depositing coatings on interior surfaces of components, such as transition pieces within the combustor section of a gas turbine.

According to a first aspect of the invention, a spray gun is provided that includes a tubular body having a longitudinal axis and an exit at one end thereof. The body has a first portion defining a converging passage, a second portion defining a diverging passage that defines the exit of the body, and a throat portion therebetween that defines a throat between and connecting the converging and diverging passages. The gun is further equipped with at least one gas inlet for introducing a gas upstream of the converging passage, and at least one feedstock inlet for introducing a feedstock at or immediately upstream of the throat.

According to another aspect of the invention, a process is provided for depositing a coating with a spray gun. The method generally entails introducing a gas upstream of a converging passage within a tubular body of the spray gun, after which the gas travels through the converging passage, through a throat within the body, and then through a diverging passage within the body that defines an exit of the spray gun. The gas exits through the exit at a supersonic velocity. A particulate feedstock is introduced at or immediately upstream of the throat, and exits the gun through the exit at a subsonic or supersonic velocity to deposit on a surface to form a coating thereon.

Another aspect of the invention is a component on which a coating can be deposited in a manner as described above, for example, on an interior surface of a transition piece of a gas turbine engine combustor, as well as other hollow structures and components with confined internal surfaces.

In view of the above, it can be seen that a technical effect of this invention is the ability to use a cold spray process as a viable and economical alternative to existing deposition processes for surfaces otherwise difficult to access with conventional cold spraying equipment. Cold spraying processes enabled by this invention can be used to deposit wear-, corrosion-, erosion- and oxidation-resistant coatings, including but not limited to coatings formed of WC, WC—Co, $Cr_2C_3$, NiCr, $Cr_2C_3$—NiCr, TiN, TaC, MCrAlX, chromium-tungsten alloys, cobalt and other cobalt-based alloys, as well as combinations of these materials to produce multilayered coatings.

Other aspects and advantages of this invention will be better appreciated from the following detailed description.

BRIEF DESCRIPTION OF THE DRAWINGS

FIG. 1 is a side view of a cold spray gun configured in accordance with an embodiment of the invention.

FIG. 2 is an end view of the cold spray gun of FIG. 1.

FIGS. 3 and 4 are schematic representations of cross-sectional views for alternative nozzle configurations for the cold spray gun of FIGS. 1 and 2.

DETAILED DESCRIPTION OF THE INVENTION

Figure 7:
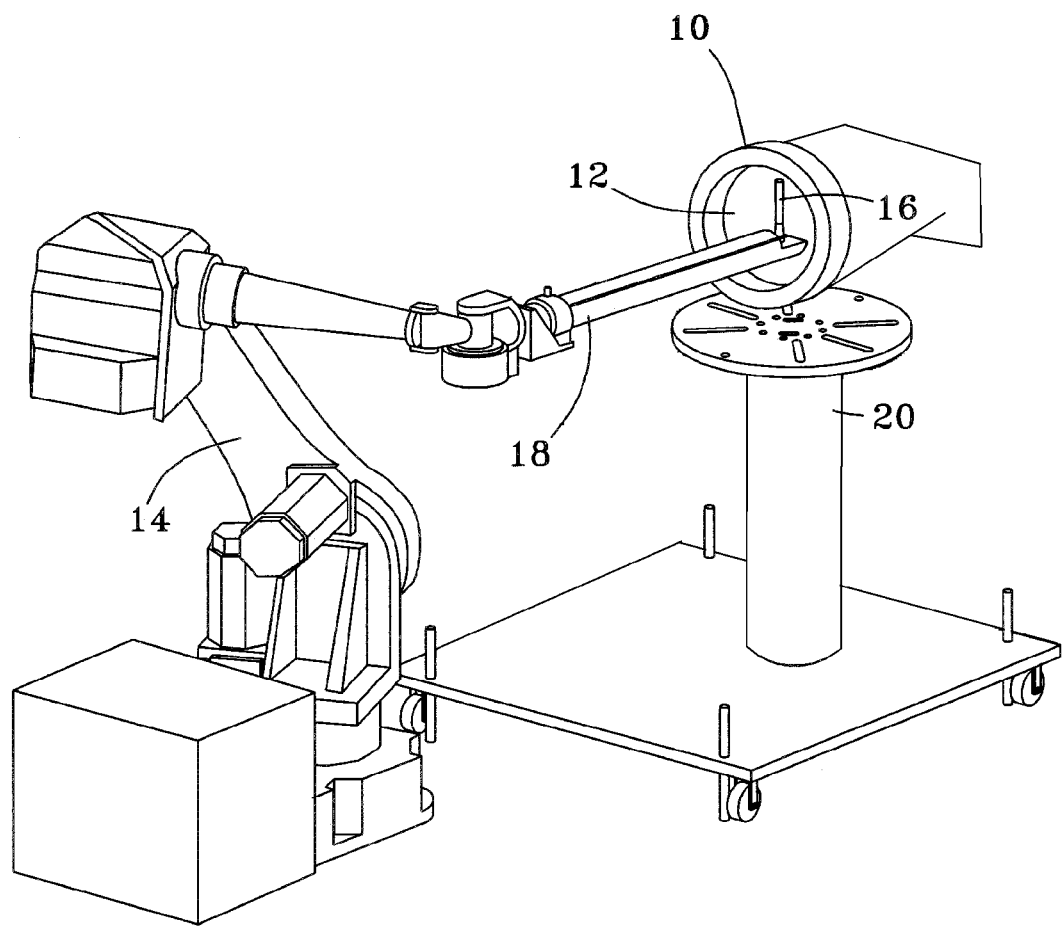
FIG. 7 is a schematic representation showing the use of the apparatus of FIGS. 5 and 6 to deposit a coating on an interior surface within a transition piece of an industrial gas turbine engine combustor.

The present invention will be described in reference to depositing a coating on a transition piece 10 of a combustor for an industrial gas turbine, as schematically represented in FIG. 7. As known in the art, combustors and their transition pieces may have a can-type or annular-type configuration, defining interior surfaces that are difficult to access with conventional cold spraying guns of the prior art. These interior surfaces (12 in FIG. 7) benefit from protection by a coating, including but not limited to a dense, oxide-free metallic coating whose composition offers protection from wear, corrosion, oxidation and erosion, nonlimiting examples of which include WC, WC—Co, $Cr_2C_3$, NiCr, $Cr_2C_3$—NiCr, TiN, TaC, MCrAlX, chromium-tungsten alloys, cobalt and other cobalt-based alloys, as well as combinations of these and other materials to produce multilayered coatings. While well suited for depositing coatings on transition pieces, the invention is also applicable to depositing a variety of coatings on various types of components, particularly those having internal surfaces that are not readily accessible with conventional cold spraying guns, as well as other surfaces that can benefit from an overlay coating.

FIG. 7 depicts an apparatus 14 equipped with a cold spraying gun 16 mounted at the end of an extension bracket 18. The transition piece 10 is represented as being of a type whose internal surfaces to be coated are not readily accessible by conventional cold spraying guns as a result of its small internal diameter. The transition piece 10 is shown supported on a table 20, which may be monitored with appropriate position sensors to provide feedback to the apparatus 14 to achieve precise control over the orientation and position of the gun 16 within the transition piece 10, enabling a coating to be deposited essentially anywhere on the interior surface 12 of the transition piece 10. Apparatuses and control systems suitable for this purpose are known and commercially available, and therefore will not be discussed in any detail here.

The cold spray gun 16 represented in FIG. 7 is shown in isolation in FIGS. 1 and 2. As evident from FIG. 1, the gun 16 has a generally tubular-shaped body 22 that defines a base section 24 and a nozzle section, the latter of which comprises a converging portion 26 that defines a converging passage (38 in FIGS. 3 and 4) within the gun 16, a diverging portion 28 that defines a diverging passage (40 in FIGS. 3 and 4) within the gun 16, a throat portion 30 between the converging and diverging portions 26 and 28 that defines a throat (42 in FIGS. 3 and 4) between the converging and diverging passages 38 and 40 and having a cross-sectional area A*, and an exit 32 that defines the cross-sectional exit area A at the outlet 32 of the nozzle section. While shown as having circular cross-sections, other cross-sectional shapes are possible for the converging and diverging passages 38 and 40 and throat 42, for example, square, octagonal, etc. The gun 16 is further equipped with one or more powder inlets (injectors) 34 through which powder feedstock is injected into the nozzle section, and one or more gas inlets 36 through which a process gas (for example, helium, air, nitrogen, etc.) enters the interior of the gun 16 to accelerate the feedstock particles through the nozzle section and achieve a supersonic gas flow and particle velocities of 200 m/s and higher. As discussed in reference to equation (1), exit velocities of the process gas and particles at the exit 32 depend on the ratio A/A*. In FIG. 2, three powder inlets 34 are shown equi-angularly spaced about the perimeter of the gun 16 adjacent the throat portion 30, and two gas inlets 36 are shown diametrically opposed and offset from the axis of the nozzle section to ensure substantially uniform flow conditions prior to the process gas entering the throat 42 of the nozzle section. Suitable diameters for the feedstock inlets 34 are believed to be in a range of about five to fifteen millimeters, though less and greater diameters are foreseeable. Suitable diameters for the inlets 34 will depend on the particle size of the feedstock, with finer feedstock particles permitting narrower inlets.

FIGS. 3 and 4 schematically depict the interior geometry within the converging, diverging and throat portions 26, 28 and 30 of the nozzle section, and particularly their corresponding converging and diverging passages 38 and 40 and throat 42 that define the converging-diverging internal geometry of the nozzle. Importantly, the powder inlets 34 are shown in FIGS. 3 and 4 as injecting the powder feedstock at or immediately upstream of the throat 42, for example, within about 50 mm and more preferably not more than 5 mm from the narrowest cross-section of the throat 42. This aspect distinguishes the invention in part from the prior art practice of locating the feedstock inlets far upstream of the converging passage 38 and throat 42, typically in what would correspond to the constant cross-section base section 24 of the present gun 16 or even farther upstream of a conventional cold spray gun, as shown in U.S. Pat. No. 5,302,414. By placing the feedstock inlets 34 at or immediately adjacent the throat 42, it is believed that the overall length of the nozzle section and its converging-diverging passages 38 and 40 can be significantly shortened, for example, to combined lengths of 200 mm and less, for example, about 75 mm. As a result, the gun 16 is capable of being placed in relatively small cavities, a particular example being the interior of the combustor transition piece 10 as shown in FIG. 7. Nonlimiting but exemplary lengths for the converging and diverging portions 26 and 28 are about 15 to about 50 mm and about 50 to about 150 mm, respectively, though lesser and greater lengths are foreseeable. These lengths are believed to be sufficient to achieve supersonic gas and particle velocities, though are considerably less than what has been believed to be required by conventional cold spray guns. The throat 42 defined by the throat portion 30 may be limited to the intersection between the converging and diverging passages 38 and 40 (in other words, zero length) or may have a limited length, for example, up to about 25 millimeters. A throat 42 having a measurable length has the effect of collimating the gas flow and may also provide additional space for positioning the feedstock inlets 34.

For converging and diverging portions 26 and 28 having the lengths noted above, typical cross-sectional areas for the converging-diverging nozzle are about 75 to about 3000 mm$^2$ at the entrance to the converging passage 38, about 20 to about 2000 mm$^2$ at the throat 42 (which defines the exit of the converging passage 38 and the entrance to the diverging passage 40), and about 75 to about 3000 mm$^2$ at the exit to the diverging passage 40 (which defines the exit 32 of the gun 16). Within these ranges, preferred cross-sectional areas provide for exit-throat area ratios of about 1.1 to about 15, which are capable of achieving supersonic velocities. Gas mass flow rates to achieve a choked condition of the nozzle can be calculated using one-dimensional isentropic gas flow equations cited in references such as the aforementioned book authored by Oosthuizen and Carscallen. Gas mass flow rates can be monitored and controlled with sensors and mass flow controllers. Temperature and/or pressure sensors (not shown) may be used to monitor the gas temperature and pressure within the base section 24 or elsewhere upstream of the throat 42.

The feedstock inlets 34 shown in FIGS. 3 and 4 differ from each other primarily as a result of the inlets 34 in FIG. 3 entering the converging passage 38 upstream of the throat 42, facing the throat 42, and injecting the feedstock downstream toward the throat 42, while in FIG. 4 the inlets 34 enter the diverging passage 40 downstream of the throat 42, face the throat 42, and inject the feedstock within the throat 42. Alternatively, the inlets 34 of FIG. 4 could inject the powder feedstock immediately downstream of the throat 42, for example, within about 50 mm and more preferably not more than 5 mm from the narrowest cross-section of the throat 42. The feedstock inlets 34 of both FIGS. 3 and 4 are also notable for having axi-radial orientation, instead of either solely axial or solely radial, though the latter are also within the scope of the invention. While the inlets 34 are shown as being defined by tubes that physically project into the converging-diverging passage of the nozzle, it is foreseeable that the feedstock could enter the converging-diverging passage at inlets that are flush with the interior surface of the nozzle.

Figure 5:
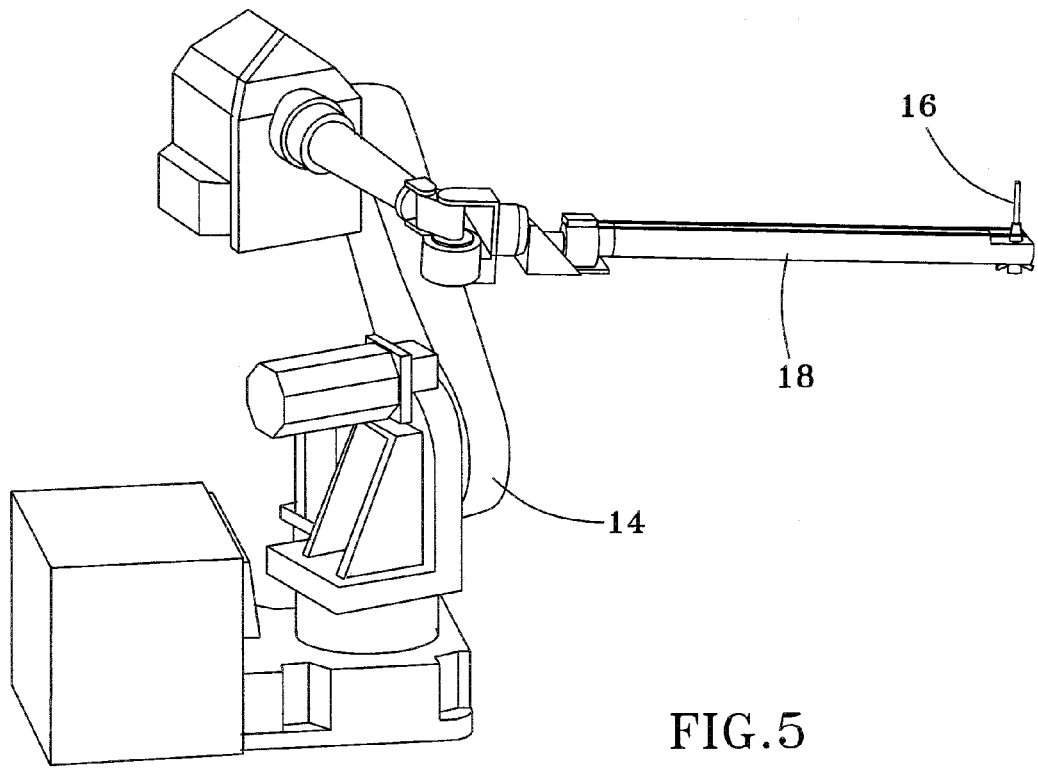
FIG. 5 is a schematic representation of the cold spray gun of FIGS. 1 through 4 mounted to an extension bracket of a cold spraying apparatus.
Figure 6:
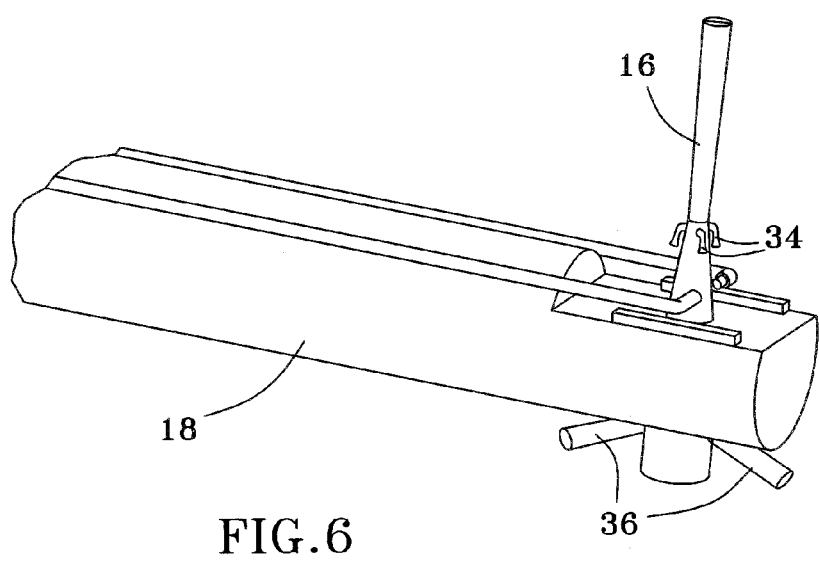
FIG. 6 is a close-up schematic representation of the extension bracket and mounted cold spray gun of FIG. 5.

The extension bracket 18 represented in FIGS. 5 through 7 is intended to enable the gun 16 to be placed well within an internal cavity of a component, such as the transition piece 10 of FIG. 7. The gun 16 is shown in FIGS. 5 through 7 as mounted transverse to the length of the bracket 18, whose profile is smaller than the gun 16. The apparatus 14 preferably provides robotic control of the bracket 18 to enable precise placement and orientation of the gun 16 relative to the component being coated. Suitable stand-off distances between the exit 32 of the gun 16 and the targeted surface are generally believed to be on the order of about one inch (about 25 mm), as compared to about three inches (about 75 mm) or more for conventional thermal spraying processes. By appropriately controlling the operation, position, and stand-off distance of the gun 16, build-up of the deposited feedstock can be accurately controlled to produce a coating of desired thickness on components with relatively complex geometries. Minimum controllable thicknesses are believed to be as low as about 5 to 10 micrometers, which is typically not possible with conventional thermal spray processes.

Suitable feedstocks will depend on the coating application. Generally, cold spraying feedstocks can be metallic, intermetallic, and cermet compositions having particles sizes of up to about 150 micrometers, with a preferred range believed to be about five to about twenty-five micrometers. Particulate feedstocks that can be employed include but are not limited to nanocrystalline (e.g., cryo-milled) feedstocks, agglomerated feedstocks, blends of feedstock materials, mechanically alloyed feedstocks, atomized, sintered and crushed powders, electro-deposited powders, etc. Notably, because high temperatures that can lead to recrystallization are avoided, the cold spray process is well suited for using nanocrystalline particle feedstocks to achieve additional benefits in terms of properties of the deposited coating. In addition, graded coatings, including graded metallic/ceramic coatings, can be deposited by gradually modifying the composition of the feedstock introduced into the gun 16.

As an inherent benefit of cold spraying, the feedstock materials are not oxidized or undergo a chemical or physical change prior to impacting the targeted surface. The resulting deposits are capable of forming a dense coating that is metallurgically bonded to the targeted surface. It is believed that cold-sprayed coatings do not require grit blasting as part of the surface preparation process in order to achieve a well-adherent coating. The dense and metallurgically bonded coating will often be more amenable to post-processing treatments, such as heat treatment, grinding, machining, etc.

Because of the relatively low temperatures involved in cold spraying, typically process gas temperatures of about 800° C. or less, masking requirements are much less stringent than in comparison to conventional thermal spraying processes. While depositing a coating on the internal surface 12 of the transition piece 10, a sealed environment can be created within the internal space defined by the surface 12, and a pump (not shown) can be used to extract the process gas and the particle over-spray that does not adhere to the targeted surfaces. The recovered gas and particles can then be recycled and reused if so desired.

While the invention has been described in terms of particular embodiments, it is apparent that one skilled in the art could adopt other forms of the apparatus 14 and gun 16. Furthermore, the spraying apparatus 14 could be adapted for depositing coatings during the production and repair of a variety of different components. Accordingly, the scope of the invention is to be limited only by the following claims.

The invention claimed is:

1. A Spray Gun Comprising:
a tubular body having a longitudinal axis and an exit at one end thereof, the body having a first portion defining a converging passage, a second portion defining a diverging passage downstream of the converging passage and defining the exit of the body, and a throat portion therebetween that defines a throat between and connecting the converging and diverging passages;
at least one gas inlet which enters the body at a constant cross-section portion of the body located upstream of the converging portion for introducing a gas upstream of the converging passage; and
at least one feedstock inlet disposed directly within either the converging passage or the diverging passage with an axi-radial orientation relative to the body for introducing a feedstock at or immediately upstream of the throat.

2. The spray gun according to claim 1, wherein the converging and diverging passages have a combined length of not more than 200 mm.

3. The spray gun according to claim 2, wherein the converging passage has a length of not more than 50 mm.

4. The spray gun according to claim 2, wherein the converging passage has a length of about 15 to about 50 mm.

5. The spray gun according to claim 2, wherein the diverging passage has a length of not more than 150 mm.

6. The spray gun according to claim 2, wherein the diverging passage has a length of about 50 to about 150 mm.

7. The spray gun according to claim 2, wherein the throat has a length of up to about 25 mm.

8. The spray gun according to claim 1, wherein the diverging passage and the throat have cross-sectional areas that yield an exit-throat area ratio of about 1.1 to about 15.

9. The spray gun according to claim 1, wherein the at least one feedstock inlet comprises a plurality of equi-angularly spaced feedstock inlets surrounding the throat portion.

10. The spray gun according to claim 1, wherein the at least one feedstock inlet has an axi-radial orientation relative to the body and enters the converging passage upstream of the throat, faces downstream toward the throat, and is oriented to inject feedstock directly into the converging passage downstream toward the throat in an axi-radial direction of the body.

11. the spray gun according to claim 1, wherein the at least one feedstock inlet enters the diverging passage downstream of the throat, faces upstream toward the throat, and is oriented to inject feedstock directly within the throat in an axi-radial direction of the body.

12. The spray gun according to claim 1, wherein the at least one gas inlet comprises two diametrically-opposed gas inlets.

13. The spray gun according to claim 1, wherein the spray gun is mounted to a robotic apparatus adapted to position and orient the gun relative to a targeted surface.

14. A process of depositing a coating with the spray gun of claim 1, the method comprising:
introducing a gas upstream of the converging passage within the tubular body of the spray gun, the gas traveling through the converging passage, through the throat within the body, and then through the diverging passage within the body that defines the exit of the spray gun, the gas exiting through the exit at a supersonic velocity; and
introducing a particulate feedstock at or immediately upstream of the throat and directly within either the converging passage or the throat, the particulate exiting through the exit at a subsonic or supersonic velocity and depositing on a surface to form a coating thereon.

15. The process according to claim 14, wherein the converging and diverging passages have a combined length of not more than 200 mm.

16. The process according to claim 14, wherein the diverging passage and the throat have cross-sectional areas that yield an exit-throat area ratio of about 1.1 to about 15.

17. The process according to claim 14, wherein the at least one feedstock inlet has an axi-radial orientation relative to the body and enters the converging passage upstream of the throat, and the particulate feedstock directly enters the converging passage upstream of the throat and is injected downstream toward the throat in an axi-radial direction of the body.

18. The process according to claim 14, wherein the at least one feedstock inlet has an axi-radial orientation relative to the body and enters the diverging passage downstream of the throat, and the particulate feedstock is injected in an upstream direction directly into the throat in an axi-radial direction of the body.

19. The process according to claim 14, wherein the surface is an interior surface of a transition piece of a gas turbine engine combustor.

* * * * *